United States Patent [19]

Marans

[11] 3,964,960

[45] June 22, 1976

[54] PROCESS FOR CONCENTRATING BRINE

[75] Inventor: Nelson S. Marans, Silver Spring, Md.

[73] Assignee: W. R. Grace & Co., New York, N.Y.

[22] Filed: July 12, 1974

[21] Appl. No.: 487,922

[52] U.S. Cl. .............................. 159/49; 159/1 W; 159/7; 159/DIG. 28
[51] Int. Cl.² ........................................ B01D 1/22
[58] Field of Search ..... 159/1 W, 5, 49, 7, DIG. 28; 202/236; 203/89; 261/92

[56] References Cited
UNITED STATES PATENTS

| | | |
|---|---|---|
| 1,857,884 | 5/1932 | Skogmark ............................ 159/7 |
| 3,169,102 | 2/1965 | Weiswurm .................. 159/DIG. 28 |
| 3,170,852 | 2/1965 | Barnhart, ............................ 159/7 X |
| 3,194,297 | 7/1965 | Coe ........................................ 159/7 |
| 3,236,768 | 2/1966 | Litt ..................................... 159/1 W |
| 3,269,920 | 8/1966 | Merrill ................................ 159/5 R |
| 3,312,600 | 4/1967 | Morton ........................ 159/DIG. 28 |
| 3,352,297 | 11/1967 | Martin et al. ...................... 261/92 X |
| 3,393,131 | 7/1968 | McIntgre, Jr. .................. 202/236 X |
| 3,895,083 | 7/1975 | Yeagle .................................. 261/92 |

*Primary Examiner*—Jack Sofer
*Attorney, Agent, or Firm*—Elton Fisher

[57] ABSTRACT

A brine is absorbed in a brine absorbing means and water is evaporated from the absorbed brine to form a concentrated brine which is removed from the brine absorbing means and recovered.

3 Claims, 4 Drawing Figures

PROCESS FOR CONCENTRATING BRINE

BACKGROUND OF THE INVENTION

This invention is the field of brine concentration.

Prior art methods for concentrating brine and the like are taught by the Second Edition of the Kirk-Othmer Encyclopedia of Chemical Technology, John Wiley and Sons, Inc. (e.g., pp. 559–580 of Volume 8 (1965) and pp. 445–465 of the 1971 Supplement Volume).

U.S. Pat. Nos. 3,501,381 (202/83), 3,441,482 (202/175), and 3,269,920 (202/173) also teach methods for evaporating water from brine to concentrate the brine.

SUMMARY

Brine is concentrated by a process comprising absorbing the brine in a brine absorbing means, evaporating water from the absorbed brine to form a concentrated brine in the brine absorbing means, removing the concentrated brine from the brine absorbing means, and recovering the concentrated brine.

DESCRIPTION OF PREFERRED EMBODIMENTS

In a preferred embodiment of this invention the brine absorbing means is a solid self-supporting hydrophilic foam - e.g., a foam made of polyurethan having a plurality of oxyethylene groups (i.e., a polyurethan in which at least 30 weight percent of the polyurethan is oxyethylene groups), a polyacrylate, a polymethacrylate, an acrylamide-acrylic acid copolymer, or an acrylamide-methacrylic acid copolymer.

In another preferred embodiment of this invention the brine absorption means is a sponge (or a plurality of sponges). This sponge can be a natural sponge, a cellulose sponge, or a sponge made of any solid self-supporting hydrophilic polymer.

DETAILED DESCRIPTION OF THE INVENTION

In the process of this invention a brine (e.g., sea water, brine from a salt lake such as the Great Salt Lake, or any other natural or synthetic brine) is concentrated by absorbing the brine in a brine absorbing means, evaporating water from the absorbed brine, and squeezing the resulting concentrated brine from the brine absorbing means. The concentrated brine can then be sent through a final drying step to produce a solid product. Where using a brine containing a plurality of dissolved salts such as the underground brines obtained at Wendover fractional crystallization can be used to separate and recover valuable salts from the brine which has been concentrated by the process of this invention.

Alternatively, the concentrated brine prepared by the process of this invention can be further processed by again absorbing the concentrated brine in a brine absorbing means, concentrating the absorbed brine, squeezing the concentrated brine from the brine absorbing means and recovering the twice concentrated brine. If desired, this procedure can be repeated one or more times until the brine has reached a predetermined concentration.

Figures 1, 2:
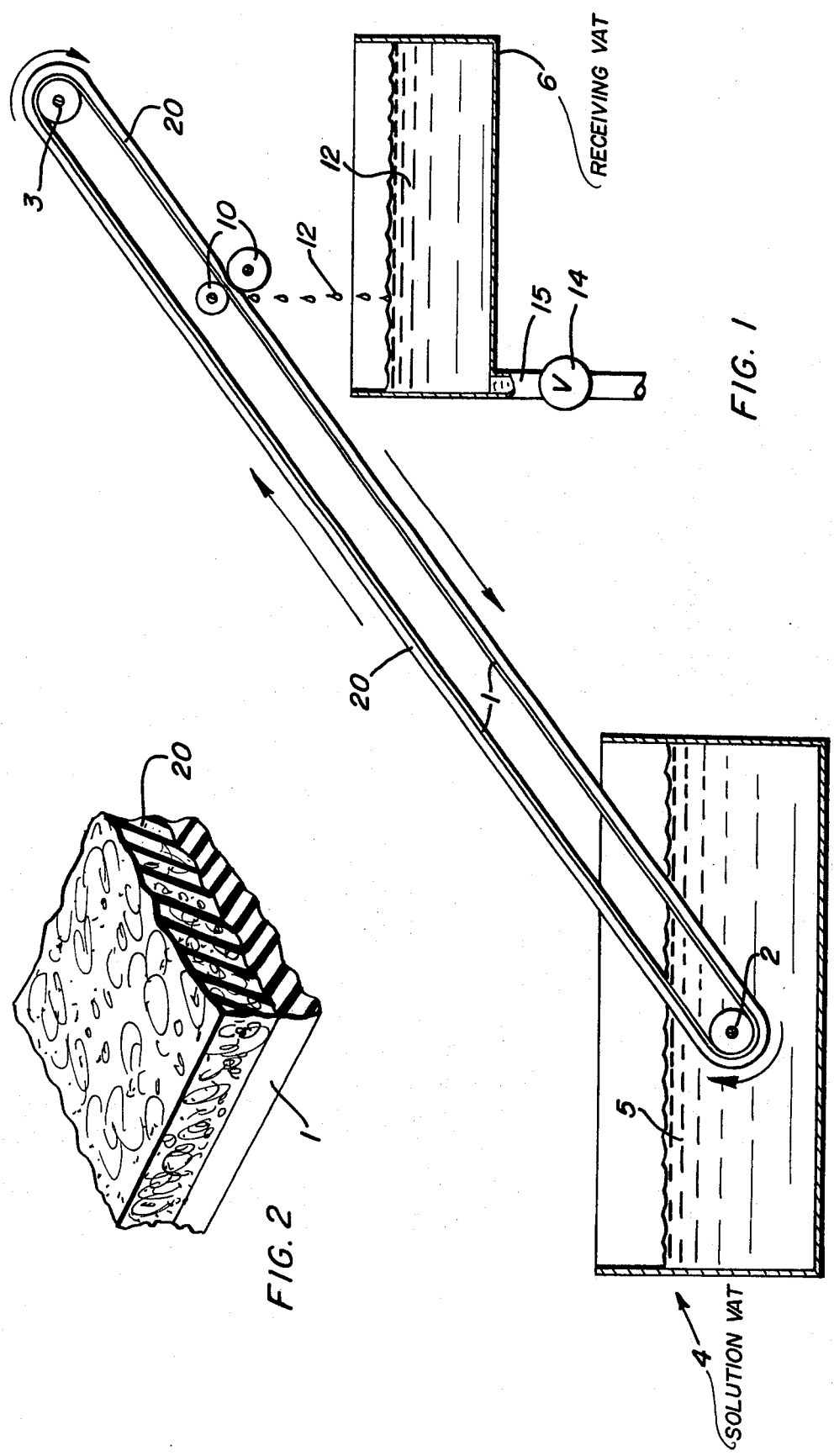
FIG. 1 is a schematic drawing showing a preferred method for conducting the process of this invention.
FIG. 2 is a more detailed cross section drawing of a portion of the endless belt of FIG. 1 with the brine absorbing means on one surface thereof.

FIG. 1 represents a preferred method for conducting the process of this invention.

Brine 5 can be placed in brine vat 4, and endless belt 1 having brine absorbing means 20 on at least one of its (the belt's) surfaces can be continuously passed through brine 5 in brine vat 4 to absorb a portion of the brine in brine absorbing means 20.

Brine vat 4 can be a tank, a drum, a trough or the like, or it can be a brine containing trench. If desired, brine vat 4 can be dispensed with and belt 1 with brine absorbing means 20 adhering to at least one of its surfaces can be passed into a brine lake or into the sea or an arm or inlet thereof.

The upper run of continuous endless belt 1 having two surfaces, an interior surface and an exterior surface, and two runs, an upper run and a lower run, can be continuously passed upward from brine vat 4 to upper supporting roller 3 and receiving vat 6 while continuously evaporating water from the absorbed brine to form a concentrated brine in brine absorbing means 20.

Water will be evaporated into the atmosphere from the brine held in brine absorbing means 20 as belt 1 moves upward under ordinary atmospheric conditions. However, the rate of evaporation can be increased by operating in bright sunshine or by using a heat source (e.g., steam coils, infra red lights, hot water coils, jets of warmed air, or the like) to increase the temperature of the absorbed brine. The rate of evaporation can also be increased blowing air (e.g., ordinary atmospheric air, dehumidified air, heated air, or heated and dehumidified air) over the brine in brine absorption means 20 as belt 1 moves upward.

As endless belt 1 continuously moves upward to roller 3, it (belt 1) will also continuously move downward from upper supporting roller 3 to lower supporting roller 2 which can preferably (but not necessarily) be positioned in brine vat 4.

Concentrated brine 12 can be continuously squeezed from absorbing means 20 as the lower run of endless belt 1 passes downward from upper support roller 3 to lower support roller 2 by passing endless belt 1 (and absorbing means 20) between rollers 10 which are positioned and adjusted to squeeze concentrated brine 12 from brine absorbing means 20. If desired, several banks of rollers 10 can be used.

Concentrated brine 12 can be continuously collected in receiving vat 6. Concentrated brine 12 can be removed from receiving vat 6 via line 15 and valve 14.

Figure 3:
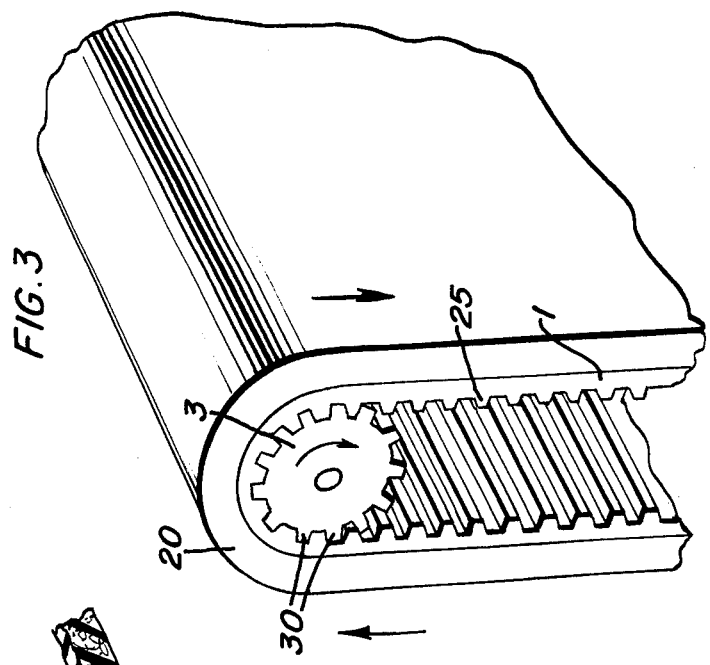
FIG. 3 is a cross section drawing of the upper roller of FIG. 1 and a portion of the belt with brine absorbing means on one surface thereof.

FIG. 3 shows a preferred means for driving endless belt 1. Gear type teeth 30 of upper supporting roller 3 engage teeth 25 of endless belt 1 - i.e., the teeth of the belt mesh with and fit between the teeth of the rotating upper roller to move said belt 1 as roller 3 rotates. Power (energy) for rotating roller 3 can be applied from a motor or engine (not shown) via a gear box and (drive shaft) not shown or via a chain drive (not shown). Other means for driving endless belt 1 will be readily apparent to those skilled in the art. Such means include (but are not limited to) friction driving via driving energy applied to upper supporting roller 3 or lower supporting roller 2.

Figure 4:
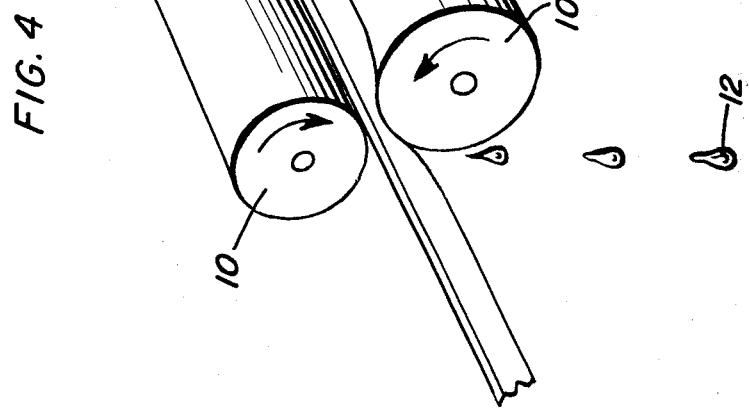
FIG. 4 is a cross section drawing illustrating a preferred method for squeezing concentrated brine from the brine absorbing means.

FIG. 4 is a cross section view of belt 1 and brine absorbing means 20 passing between rollers 10 to squeeze concentrated brine 12 from absorbing means 20.

Solid self-supporting hydrophilic foams which can be used with excellent results in the process of this invention include:

1. A polyurethan foam prepared from a prepolymer formed by reacting a mixture of commercially available polyethylene glycol 600 and trimethylopropane (2:1 mole ratio) with 95 percent of the theoretical amount of toluenediisocyanate. The foam is prepared from the prepolymer (100 parts) and 1 part of a silicone surfactant (L-520 obtained from Union Carbide Corp.) by mixing with 50 parts of water. This foam which has a bulk density of about 3.5 pounds per cubic foot and which contains more than 30 weight percent oxyethylene groups was designated "Foam 1."

2. A polyurethan foam prepared from a prepolymer obtained by reacting a mixture of commercially available polyethylene glycol 1000 and glycerol (1:1 mole ratio) with 100 percent of the theoretical amount of toluenediisocyanate. The foam is prepared from 100 parts of prepolymer and 1 part of the above-mentioned silicone surfactant L-520 by mixing with 100 parts of $H_2O$.

3. A polyurethan foam prepared from a prepolymer formed by reacting a mixture of commercially available polyethylene glycol 1000 and glycerol (2:1 mole ratio) with 100 percent of the theoretical amount of toluenediisocyanate. The foam is prepared from this prepolymer by the general procedure used to prepare Foam 2, supra. This foam which has a bulk density of about 3.6 pounds per cubic foot and which contains more than 30 weight percent oxyethylene groups was designated "Foam 3."

4. A reticulated polyurethan foam prepared from a prepolymer obtained by reacting a 100 gram portion of mixture of commercially available polyethylene glycol 1000 and trimethylol propane (2:1 mole ratio) with 110 percent of the theoretical amount of toluenediisocyanate. The foam is formed by adding 100 grams of the prepolymer to 100 grams of a 1 percent soluton of Pluronic P-75, an emulsifier having an HLB (Hydrophile-Lipophile balance) of about 16. Pluronic P-75 is commercially available (BASF-Wyndotte). The resulting foam which contains more than 30 weight percent oxyethylene groups and has a bulk density of 3.1 pounds per cubic foot was designated "Foam 4."

The rate of brine absorption was very rapid with all of the above-described foams (Foams 1–4).

The instant invention will be better understood by referring to the following specific but nonlimiting examples. It is understood that said invention is not limited by these examples which are offered merely as illustrations; it is also understood that modifications can be made without departing from the spirit and scope of the invention.

EXAMPLE 1

A brine was prepared by dissolving 50 g of sodium chloride and 50 g of potassium chloride in 400 g of water. This brine was designated "Brine A".

EXAMPLE 2

A slab of Foam 1 (13.0 × 4.5 × 0.88 centimeters) was immersed in a portion of Brine A. In 12 minutes this slab of Foam 1 had absorbed 1100 percent of its weight of the brine, and in 2 hours it absorbed 1360 percent of its weight of the brine.

The slab of Foam 1 was removed from the brine and exposed to the atmosphere of the room in which the test was made (room temperature about 25°C and relative humidity about 30 percent). Water was evaporated from the absorbed brine at the rate of 0.1 percent per minute (based on the weight of brine absorbed) during the first 3 hours of exposure to the atmosphere. In 16 hours 41 percent of the weight of the absorbed brine was lost by evaporation. The slab of foam was then squeezed to remove a portion of the absorbed brine. The thus removed brine was evaporated to dryness and found to have a solid content (dissolved salts) of 30 percent vs. 20 percent solid in the starting brine.

The residual brine was then removed from the slab of Foam 1 and found to have a solid content of 54 percent.

The slab of Foam 1 was reimmersed in a portion of Brine 1. In this test the slab of Foam 1 absorbed 1340 percent of its weight of the brine in 2 hours.

EXAMPLE 3

The general procedure of Example 2 was repeated. However, in this instance the procedure was modified by replacing the slab of Foam 1 with a slab (14.0 × 3.5 × 1.1 centimeters) of Foam 2. This slab absorbed 760 percent of its weight of the brine in 2 minutes, 880 percent in 4 minutes, and after 1 hour reached equilibrium (i.e., the amount of brine absorbed did not increase on longer immersion at 1000 percent).

On exposure to the room's atmosphere water was evaporated from the absorbed brine in the slab at a rate of 0.08 percent per minute during the first 5 hours of exposure.

EXAMPLE 4

The general procedure of Example 3 was repeated. However, in this instance the procedure was modified by replacing the 14.0 × 3.5 × 1.1 centimeter slab of Foam 2 with a slab (13.5 × 3.5 × 2.2 centimeters) of said Foam 2 - i.e., the slab in this Example is twice as thick as the slab used in Example 3.

When immersed in Brine A this slab absorbed 218 percent of its weight of brine in 2 minutes, 260 percent in 4 minutes, and 445 percent in 18 hours.

When the slab was removed from the brine and exposed to the room's atmosphere, the absorbed brine evaporated at a rate of 0.11 percent per minute during the first 4 hours exposure.

EXAMPLE 5

The general procedure of Example 2 was repeated. However, in this instance the procedure was modified by replacing the slab of Foam 1 with a slab (11.2 × 5.9 × 1.2 centimeters) of Foam 3. This slab absorbed 290 percent of its weight of the brine in 2 minutes, 370 percent in 4 minutes, 630 percent in 20 minutes, and 750 percent in 150 minutes.

When the slab was removed from the brine and exposed to the room's atmosphere, the absorbed brine evaporated at a rate of 0.054 percent per minute during the first 6 hours exposure.

EXAMPLE 6

The general procedure of Example 1 was repeated. However, in this instance the procedure was modified by replacing the slab of Foam 1 with a slab (13.0 × 7.2 × 1.5 centimeters) of reticulated Foam 4. This slab of reticulated foam absorbed 250 percent of its weight of brine in 1 minute and no further brine was absorbed on immersion for an hour showing that equilibrium, as defined in Example 3, was reached promptly (i.e., in a minute or less).

When the slab was removed from the brine and exposed to the room's atmosphere, water was evaporated from the absorbed brine at a rate of 0.094 percent per minute during the first 4 hours exposure.

EXAMPLE 7

A 31.6 g portion of Brine 1 was placed in an evaporating dish having a diameter of 9 centimeters and exposed to the atmosphere of a room having a temperature of about 25°C and a relative humidity of 30 percent. During a period of 4 hours the rate of evaporation of water from the brine in the evaporating dish was 0.004 percent per minute based on the weight of the brine added to the dish. This is an evaporation rate more than 10 times slower than the slowest rate (0.054 percent per minute in Example 5) obtained in runs made with polyurethans and reported in Examples 2–6 supra.

The process of this invention can be used to concentrate potash (e.g., KCl) containing brines which can be further processed to prepare KCl for use as a fertilizer.

The process of this invention can be used to concentrate sodium chloride containing brines which can be further process to prepare table salt and industrial grades of sodium chloride.

Self-supporting polyurethan foams - with a plurality of oxyethylene groups - made from any commercially available toluenediisocyanate, from a mixture of two or more commercially available toluenediisocyanates, from a pure isomer of toluenediisocyanate or from mixtures of a commercially available diisocyanate and one or more pure isomers of toluenediisocyanate, or from a mixture of at least two pure isomers of toluenediisocyanate are operable in the process of this invention. However, I generally prefer to use a self-supporting polyurethan foam prepared from a commercially available mixture of 2,4- and 2,6-toluene-diisocyanate having about 80 mole percent of the 2,4- and 20 percent of the 2,6-isomer. A commercially available mixture of 65 mole percent of the 2,4-isomer and 35 mole percent of the 2,6-isomer is also a preferred toluenediisocyanate for preparing polyurethan foam for use in the process of this invention.

I claim:

1. A process for concentrating brine solution comprising:
   a. providing a continuous endless inclined belt having an exterior surface, an interior surface, an upper run, and a lower run between a brine containing vat in which the lower end of the belt is immersed and a receiving vat positioned at an elevation above said brine vat;
   b. running said upper run of said endless belt from said brine vat to said receiving vat exposed to ambient to partially evaporate said brine;
   c. providing a continuous layer of a self-supporting hydrophilic polyurethan foam on the exterior surface of said belt;
   d. continuously exposing the upper run of said belt from said brine vat to the ambient atmosphere to evaporate water from the brine in said foam layer to form a concentrated brine in said foam layer;
   e. continuously passing said lower run of said belt between rollers positioned over said receiving vat to continuously remove concentrated brine solution from said foam layer;
   f. continuously collecting the removed concentrated brine solution in said receiving vat; and
   g. removing the concentrated brine from said receiving vat.

2. The process of claim 1 in which the brine is sea water.

3. The process of claim 1 in which the brine is a potassium ion-containing brine.

* * * * *